United States Patent

Mizukami

[11] Patent Number: 6,015,035
[45] Date of Patent: Jan. 18, 2000

[54] CLUTCH DISK

[75] Inventor: Hiroshi Mizukami, Neyagawa, Japan

[73] Assignee: EXEDY Corporation, Neyagawa, Japan

[21] Appl. No.: 09/198,278

[22] Filed: Nov. 24, 1998

[30] Foreign Application Priority Data

Dec. 3, 1997 [JP] Japan .................................... 9-333015
Dec. 3, 1997 [JP] Japan .................................... 9-333016

[51] Int. Cl.[7] .................................................. F16D 13/50
[52] U.S. Cl. ..................................... 192/107 C; 192/70.11
[58] Field of Search ........................... 192/107 C, 107 R, 192/107 M, 106.2, 70.11

[56] References Cited

U.S. PATENT DOCUMENTS

| 3,526,307 | 9/1970 | Falzone | 192/107 R |
|---|---|---|---|
| 4,260,048 | 4/1981 | Beccaris | 192/107 |
| 4,375,254 | 3/1983 | Lech, Jr. | 192/107 C |
| 4,846,329 | 7/1989 | Kettell et al. | 192/107 M |
| 4,858,742 | 8/1989 | Cameron | 192/107 C |
| 4,869,356 | 9/1989 | Cameron | 192/107 C |
| 5,097,932 | 3/1992 | Flotow et al. | 192/106.2 |
| 5,167,312 | 12/1992 | Thirion De Briel et al. | 192/107 R |
| 5,174,426 | 12/1992 | Thirion De Briel et al. | 192/107 C |
| 5,199,540 | 4/1993 | Fitzpatrick-Ellis et al. | 192/70.11 |
| 5,322,151 | 6/1994 | Denton et al. | 192/107 M |
| 5,337,873 | 8/1994 | Thirion de Briel | 192/107 R |
| 5,355,985 | 10/1994 | Thirion De Briel et al. | 192/107 C |
| 5,857,551 | 1/1999 | Yoneda | 192/107 C |

FOREIGN PATENT DOCUMENTS

| 477794 | 1/1938 | European Pat. Off. | 192/107 C |
|---|---|---|---|
| 1212368 | 9/1966 | Germany . | |
| 34 34 007 | 3/1986 | Germany . | |
| 3618878 | 12/1986 | Germany | 192/107 C |
| 9-303416 | 11/1997 | Japan . | |
| 10-19056 | 1/1998 | Japan . | |
| 10-103372 | 4/1998 | Japan . | |

*Primary Examiner*—Rodney H. Bonck
*Assistant Examiner*—Tisha D. Waddell
*Attorney, Agent, or Firm*—Shinjyu An Intellectual Property Firm

[57] ABSTRACT

A clutch pad assembly 10 includes a first friction portion 31, a second friction portion 32 and a cushioning plate 35. The first friction portion 31 has a first core plate 34 and a first friction member 35 fixed to the first core plate 34. The second friction portion 32 has a second core plate 36 spaced in the disk axial direction from the first core plate 34, and a second friction member 37 fixed to the second core plate 36. The cushioning plate 35 has a cushioning portion 40 disposed between the first and second core plates 34 and 36. The second core plate 36 has an engagement portion 47 engaged with the cushioning portion 40. In an alternate embodiment, a clutch pad assembly 10 includes a pair of annular friction members 131 and 132, cushioning plate 133 and a pair of core plates 134 and 136. The cushioning plate 133 has a plurality of cushioning portions 141, 142 arranged between the paired friction members 131 and 132. The paired core plates 134 and 136 are fixed to the surfaces of the paired friction members 131 and 132 opposed to each other, respectively. One core plate 136 has engagement portions 147 engaged with the cushioning portion 142.

10 Claims, 14 Drawing Sheets

CLUTCH DISK

BACKGROUND OF THE INVENTION

A. Field of the Invention

The invention relates to a new configuration of clutch disk assembly, and more particularly, to new configuration for attaching friction material to outer radial portions of a clutch disk assembly.

B. Description of the Background Art

A clutch disk assembly used in a clutch mechanism of a vehicle includes a pair of circular input plates and an output hub having a radial flange. Elastic members are disposed between the input plates and the flange for restricting relative rotation therebetween. A clutch disk (sometimes referred to as frictional coupling portion) is formed with at least one cushioning plate between two friction facings. The clutch disk is disposed on a radially outside portion of the pair of input plates.

In some clutch disks of a clutch disk assembly, a plurality of cushioning plates between the two friction facings. The cushioning plates are disposed circumferentially about the outer periphery of the clutch disk assembly, and the two friction facings are arranged on axially opposite sides of the cushioning plates. Each cushioning plate has a fixing portion coupled to one of the input plates, e.g., by rivets, and a cushioning portion arranged between the two friction facings. The cushioning portion has a wavy section, and is deformable between the two friction facings. More specifically, the cushioning portion has a first portion arranged on one of the friction facings, a second portion arranged on the other friction facing, and a coupling portion coupling the first and second portions together. The first and second portions are axially shifted from each other so that the cushioning portion can be bent and deformed as compressive forces are applied to the friction facings during clutch engagement. The compressibility of the cushioning portion provides a cushioning effect.

In the conventional clutch disk described above, the first and second portions of the cushioning plates are fixed to the friction facings by rivets. Therefore, the friction facing cannot have a sufficiently large effective service thickness because the heads of the rivets have a minimal thickness that extends in an axial direction effectively limiting the useable thickness of the friction facing.

The friction facings of some clutch disks are formed from an organic (chemical) material and some friction facings are formed from an inorganic (metallic) material.

The metallic material is used in heavy weight vehicles and racing cars because the metal has high resistances against a heat and a surface pressure. The metallic material typically contains copper powder as its main component, and also contains tin, lead, graphite or the like as additive. The friction facing made of the metallic material is produced by heating and sintering a mixture of the foregoing materials, and the core plate is fixed thereto during the sintering. Cera-metallic facings utilizing ceramics have also been developed as the friction members made of a metallic material.

The clutch disk made of an organic material is somewhat compressible in use as a friction member and therefore may provide some cushioning effects in a clutch disk assembly. However, the clutch disk provided with such metallic friction members made of sintered alloy cannot provide a cushioning effect because the metallic material is generally not compressible. Therefore, a large shock is experienced when the clutch mechanism moves from a dis-engaged state to an engaged state. Therefore, smooth start of the vehicle is difficult. For similar reasons, shudder (abnormal vibration) and noises of the clutch are liable to occur.

For overcoming the above problems, a cushioning plate may be disposed between a pair of friction members for providing the cushioning effect. In this case, one of the friction disks is fixed to a clutch plate (part of the clutch disk assembly), and the other is fixed to the cushioning plate by rivets. However, heads of the rivets may restrict the maximum cushion quantity (i.e., the maximum allowable degree of cushioning), or may reduce the effective service thickness of the friction member. Further, the rivets increase a weight and therefore a moment of inertia of the clutch disk.

SUMMARY OF THE INVENTION

An object of the present invention is to overcome problems associated with the use of rivets in a clutch disk portion of a clutch disk assembly.

Another object of the present invention is to increase the useable thickness of a clutch disk by reducing the amount of thickness that is wasted by the existence of a rivet in the clutch disk.

In accordance with one aspect of the present invention, a clutch disk of a clutch disk assembly includes first and second friction members. The clutch disk also includes first and second core plates. The first core plate is fixed to the first annular friction member and the second core plate is fixed to the second annular friction member. A cushioning plate having first and second cushioning portions is disposed between the first and second annular friction members. The first and second cushioning portions are axially offset with respect to one another and with respect to the clutch disk assembly. At least one of the first and second core plates is formed unitarily with at least one engagement portion which engages one of the first and second cushioning portions.

Preferably, at least one of the first and second cushioning portions is provided with an aperture, and the engagement portion is a projection which extends through the aperture and the engagement portion is caulked into engagement about the aperture.

Preferably, the projection and the at least one of the first and second core plates is formed integrally from a plate material, the projection being formed by deformation of the plate material.

Preferably, the first and second friction members are each formed with an annular shape.

Preferably, the first and second friction members include a plurality of friction pads circumferentially spaced apart from one another to define the clutch disk.

In accordance with another aspect of the present invention, a clutch disk of a clutch disk assembly an annular first friction member provided with a plurality of first apertures. The first apertures are circumferentially spaced apart from one another. An annular second friction member is axially spaced from the first friction member. The second friction member is provided with a plurality of second apertures that are circumferentially spaced apart from one another, the second apertures being circumferentially offset from the first apertures. A first core plate is fixed to the first friction member. The first core plate is formed with an aperture that is axially aligned with the first aperture in the first friction member. The first core plate is further formed with at least one projection that extends in an axial direction away from the first friction member. A second core plate is fixed to the second friction member. The second core plate is formed with an aperture that is axially aligned with the second aperture in the second friction member. The second core plate is further formed with at least one projection that extends in an axial direction away from the second friction member. A plurality of cushioning plates are each formed with first and second cushioning portions which extend between the first and second core plates and which are axially offset from one another. The first cushioning portions are in contact with the first core plate and the second cushioning portions are in contact with the second core plate. The first cushioning portions each are provided with second apertures that are axially aligned with the second apertures in the second friction member, and the second cushioning portion are provided with first apertures that are axially aligned with the first apertures in the first friction member. Projections are formed on the first core plate which extend through the second aperture in the first cushioning portion. The projection formed on the second core plate extend through the first aperture formed in the first cushioning portion.

Preferably, the projections are caulked in the first and second apertures, respectively.

In accordance with another aspect of the present invention, a clutch disk of a clutch disk assembly includes a first friction portion having a first core plate and a first friction member fixed to the first core plate. A second friction portion has a second core plate and a second friction member fixed to the second core plate. The second core plate is axially spaced from the first core plate. A cushioning plate has a cushioning portion disposed between the first and second core plates, and is arranged for rotation together with the first core plate. The second core plate is formed integrally with an engagement portion that is engaged with the cushioning portion.

Preferably, a first aperture is formed in the cushioning portion, and the engagement portion is a projection that extends through the first aperture and is caulked in place in the first aperture.

Preferably, the projection extends integrally from the second core plate, and has a deformed tip end proximate a side of the cushioning portion adjacent to the first friction member.

Preferably, the first core plate is provided with a second aperture receiving the projection.

Preferably, the second core plate has circumferentially opposite ends which extend circumferentially beyond corresponding opposite ends of the second friction member, and the second core plate is provided at each of the circumferentially opposite ends with the projection. The cushioning portion is provided at corresponding circumferentially opposite ends with the first apertures.

In the clutch disk, conventional rivets are not required, therefore, the friction member (clutch disk) can have a sufficiently large effective service thickness.

In the clutch disk, connection between the pair of friction members and the cushioning plate is achieved by a simple structure.

In this clutch disk, the engagement portion has a plate-like form extending integrally from the core plate. Therefore, the weight can be reduced compared with a structure employing rivets. In particular, caulking of the engagement portions is performed through the first apertures formed in the other friction member and the corresponding apertures in the core plate.

In the clutch disk, the engagement portions have plate-like forms extending integrally from the first and second core plates, respectively, so that the weight of the structure can be smaller than that of the structure employing rivets.

In the clutch disk, the projection is inserted into the second aperture in the first core plate, and therefore interference with the first core plate is avoided.

DESCRIPTION OF THE PREFERRED EMBODIMENTS

Figure 1:
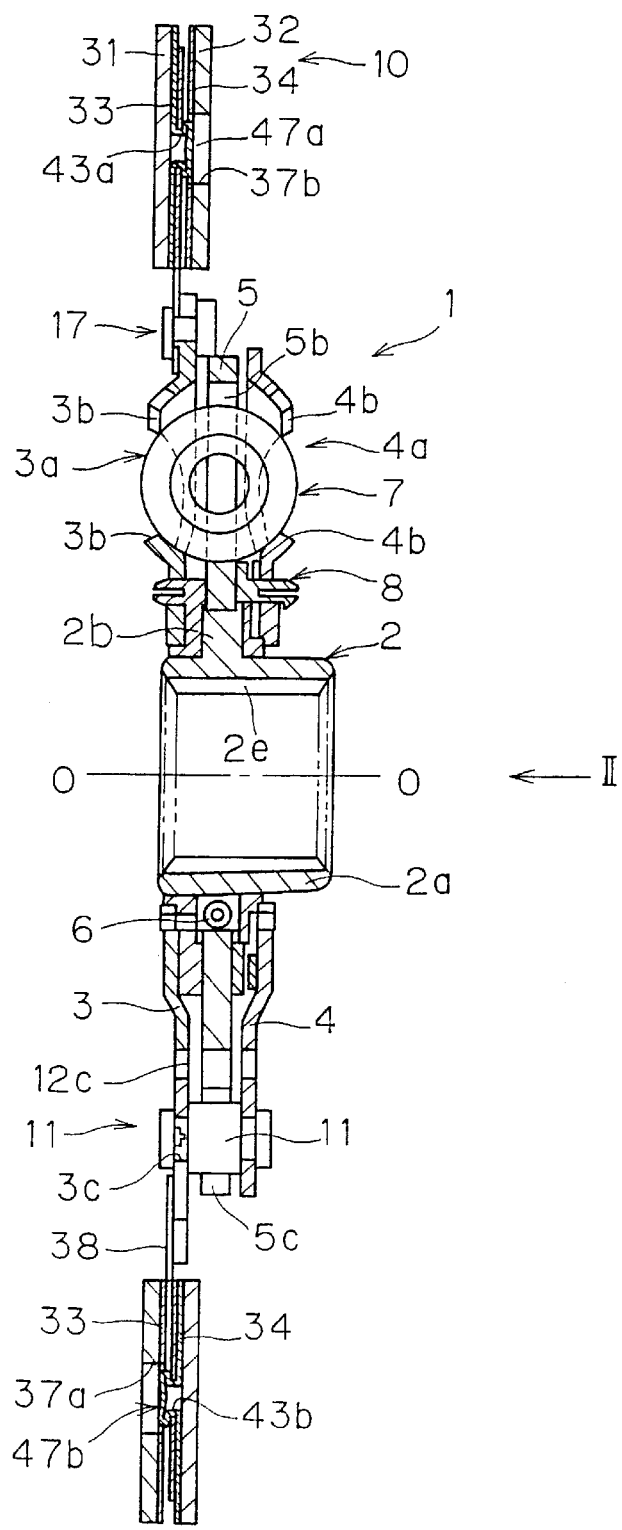
FIG. 1 is a schematic cross section of a clutch disk assembly in accordance with one embodiment of the present invention.
Figure 2:
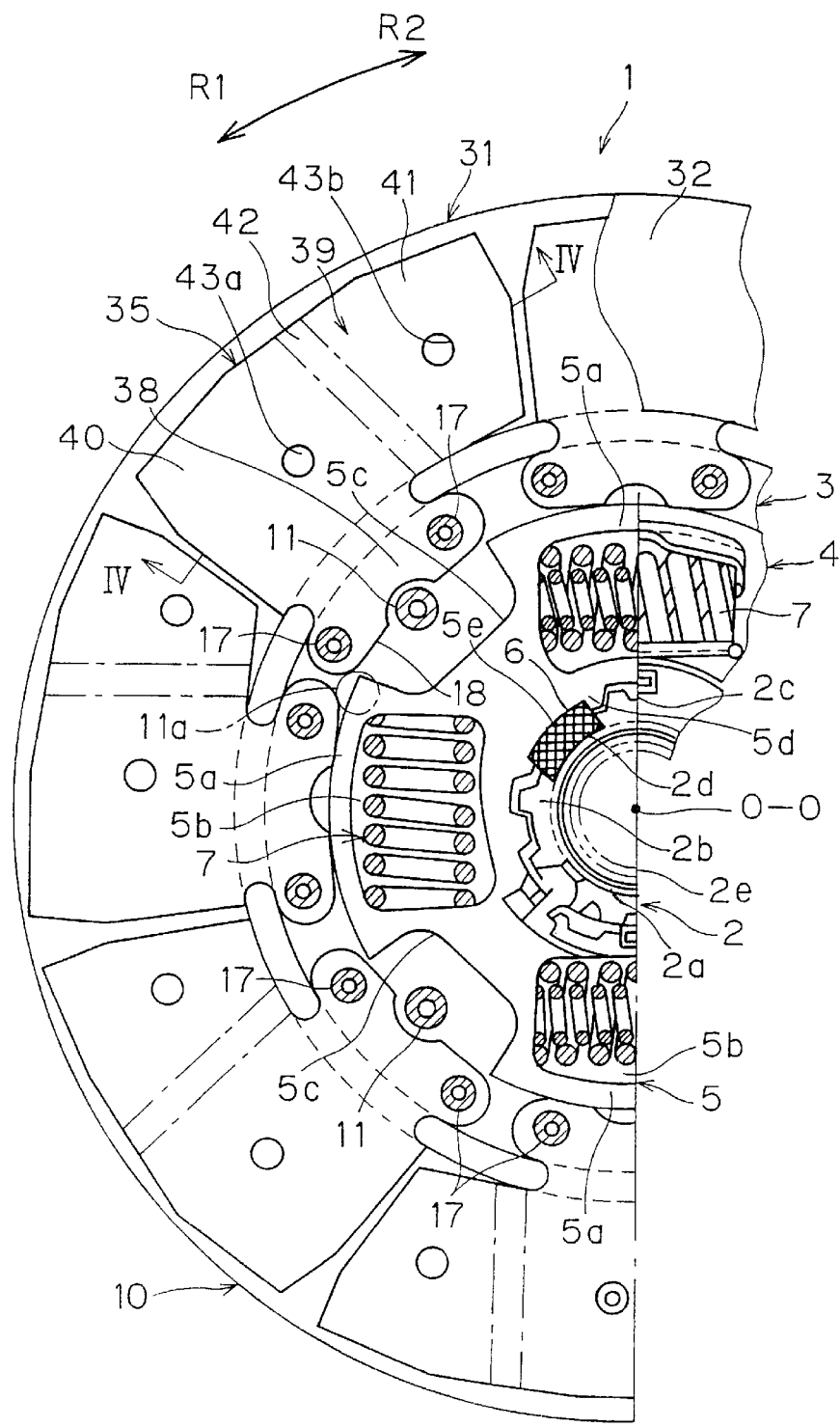
FIG. 2 is a part cross section, part elevation of the clutch disk assembly depicted in FIG. 1, looking in the direction of the arrow II in FIG. 1.

A clutch disk assembly 1 in accordance with a first embodiment of the present invention is depicted in FIGS. 1, 2, 3, 4, 5 and 6. The clutch disk assembly 1 is employed in a clutch mechanism in a vehicle for transmitting and interrupting torque transmission from an engine (not shown) on the left side in FIG. 1 to a transmission (not shown) arranged on the right side in FIG. 1. In FIG. 1, 0—0 represents a rotation axis of the clutch disk assembly 1. In FIG. 2, a direction R1 is a rotating direction of the clutch disk assembly 1, and a direction R2 is a rotation reverse direction.

The clutch disk assembly 1 basically includes a hub 2 that defines an output member and a clutch plate 3 and a retaining plate 4. The clutch and retaining plates 3 and 4 define input members. The clutch disk assembly 1 also includes a sub-plate 5, which defines an intermediate member, and small coil springs 6 arranged between the sub-plate 5 and the hub 2. The small coil springs 6 restrict relative rotation between the hub 2 and the sub-plate 5. Large coil springs 7 are arranged between the clutch and retaining plates 3 and 4 and the sub-plate 5 restricting relative rotation therebetween. A friction mechanism 8 is disposed between portions of the hub 2 and the plates 4 and 5 for generating a predetermined hysteresis torque in response to relative rotation between the plates 3 and 4 and the hub 2.

The clutch disk assembly 1 also includes a clutch disk 10, which can be frictionally coupled to an unillustrated flywheel for transmitting torque from the flywheel to the other portions of the clutch disk assembly 1.

The hub 2 is disposed at the center of the clutch disk assembly 1, and is connectable to a shaft (not shown) of the transmission. The hub 2 is formed with an axially extending cylindrical boss 2a and a flange 2b formed integrally on the outer periphery of the boss 2a. As shown in FIG. 2, the flange 2b is provided at its outer periphery with a plurality of projections 2c which are circumferentially equally spaced apart from each other. The flange 2b is provided at diametrically opposite sides with recesses 2d which retain and engage circumferentially opposite ends of the small coil springs 6, respectively. A radial inner surface of the boss 2a is provided with splines 2e which are configured for engagement with the shaft (not shown) of the transmission.

The sub-plate 5 is disposed around the flange 2b of the hub 2. The sub-plate 5 has an annular disk-like shape. As shown in FIG. 2, the sub-plate 5 has four radially outwardly extending projections 5a. Each projection 5a is provided with a circumferentially extending window or aperture 5b. Between each two adjacent projections 5a in the circumferential direction an outer recess 5c is defined. The sub-plate 5 is provided at an inner periphery thereof with inner projections 5d that extend between the projections of the hub 2 in a manner similar to gear teeth. A circumferential or angular space having a predetermined size (for instance in degrees) is kept between each projection 2c and the inner projection 5d neighboring thereto. The sub-plate 5 is provided at its inner periphery with two inner recesses 5e corresponding to the recesses 2d of the hub 2, respectively.

The small coil springs 6 are disposed in the recesses 2d and the inner recesses 5e.

The clutch and retaining plates 3 and 4 are provided with windows 3a and 4a, which are located at positions corresponding to the windows 5b in the sub-plate 5, as is depicted in FIG. 1. The large coil springs 7 (elastic members) are disposed within corresponding windows 3a and 4a and a corresponding window 5b The friction mechanism 8 is formed of various annular members that are disposed axially between the inner peripheral portions of the plates 3 and 4, and are disposed around portions the boss 2a.

The clutch and retaining plates 3 and 4 are arranged on axially opposite sides of the sub-plate 5, respectively. The clutch and retaining plates 3 and 4 are configured such that they may undergo limited relative rotary displacement with respect to the boss 2a of the hub 2. The plates 3 and 4 are fixed together at their outer peripheral portions by stop pins or contact pins 11 (fixing members) which extend in an axial direction with respect to the disk. The contact pins 11 are four in number, and are equally circumferentially spaced from each other with respect to the disk. The contact pins 11 extend through circumferentially central positions of the outer recesses 5c formed in the sub-plate 5, respectively.

The clutch disk 10 is disposed on an outer peripheral portion of the clutch plate 3. The clutch disk 10 is basically formed of a plurality of cushioning plates 35, two friction members 31 and 32, and core plates 33 and 34.

The cushioning plates 35 are described below in greater detail with reference to FIG. 2. The plurality of cushioning plates 35 are disposed about the outer peripheral portion of the clutch plate 3 at predetermined spaced apart intervals. Each cushioning plate 35 is fixed to an outer radial portion of the clutch plate 3 on a surface facing the engine (not shown), i.e., the surface on the left side of FIGS. 1 and 3. Each cushioning plate 35 is formed of a fixing portion 38 and a cushioning portion 39 extending radially outward from the fixing portion 38. The fixing portion 38 is fixed to the outer peripheral portion of the clutch plate 3 by rivets 17. Each cushioning portion 39 extends in the disk circumferential direction, and has a bent or stepped portion in a circumferential section. More specifically, the cushioning portion 39 has a first portion 40 extending radially outward from the fixing portion 38, and a second portion 41 extending in the direction R2 from the first portion 40. The second portion 41 is connected to the first portion 40 via a coupling portion 42. As is shown more clearly in FIG. 4, the second portion 41 is bent slightly such that the second portion 41 is bent with respect to the first portion 40, to be in a position shifted toward the transmission. In other words, in the absence of compressive forces acting on the clutch disk 10, the second portion 41 is axially offset from the first portion 40. Owing to this structure, the cushioning portion 39 is elastically deformable in the axial direction in response to compressive forces being applied to opposing sides of the clutch disk 10.

Each cushioning portion 39 is provided with two second apertures 43a and 43b. More specifically, the first portion 40 is provided with the second aperture 43a, and the second portion 41 is provided with the second aperture 43b. When considered with respect to the whole clutch disk 10, the second apertures 43a and 43b are circumferentially equally spaced from each other about the entire circumference of the clutch disk 10.

Figure 3:
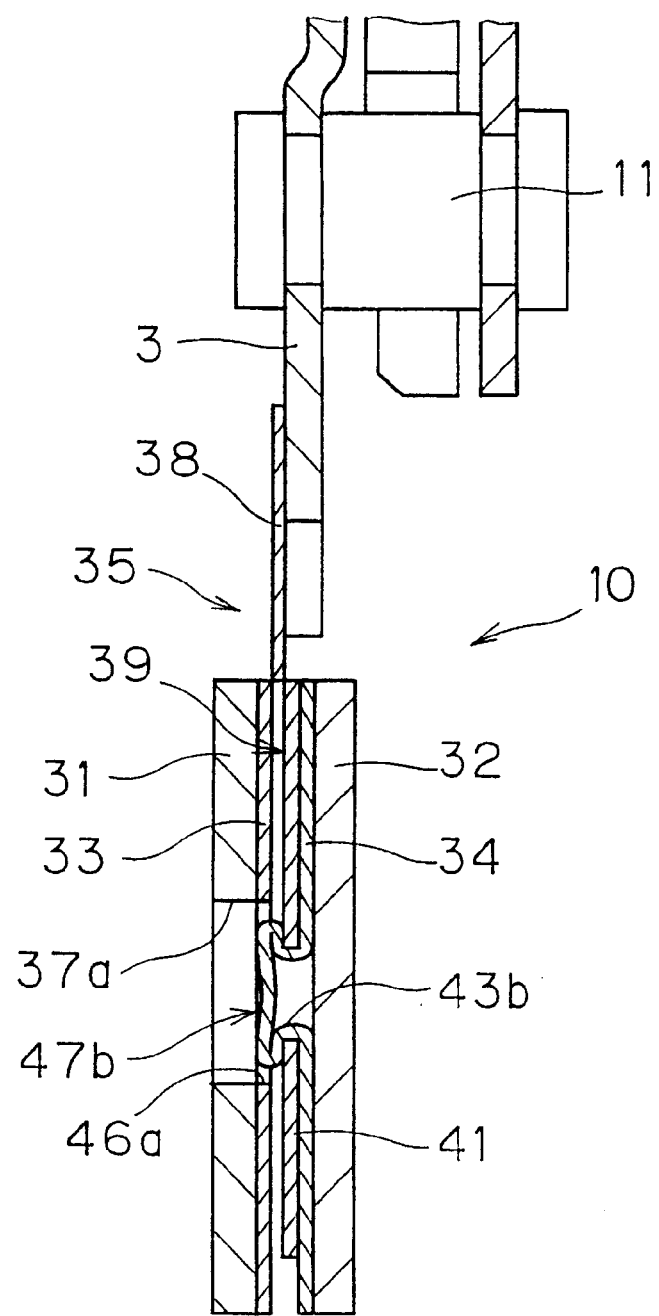
FIG. 3 is a fragmentary cross section showing, on an enlarged scale, a portion of the clutch disk assembly depicted in FIG. 1.

The first and second friction members 31 and 32 are friction facings made of, for example, an organic material having a high friction coefficient. The first and second friction members 31 and 32 in the form of annular plates, each having generally the same configuration. The first friction member 31 is disposed on the engine side of the cushioning portions 39. The second friction member 32 is disposed on the transmission side of the cushioning portions 39 The first friction member 31 is provided with a plurality of first apertures 37a circumferentially equally spaced from each other. The first apertures 37a correspond to the second apertures 43b in each of the second portions 41. More specifically, each first aperture 37a is coaxial with the corresponding second aperture 43b. The first aperture 37a has a larger radius than the second aperture 43b, as is shown in FIG. 3. Each first aperture 37a is substantially circular in shape.

An annular first core plate 33 contacts one side of the first friction member 31 between the cushioning portions 39 and the first friction member 31, as is more clearly shown in FIG. 3. The core plate 33 is made of, for instance, soft-iron, and has an extremely small axial thickness. The first core plate 33 is provided at positions corresponding to the first apertures 37a in the first friction member 31 with third apertures 46a. More specifically, the third apertures 46a and the first apertures 37a are coaxial with each other, respectively, and have the equal radii.

Figure 4:
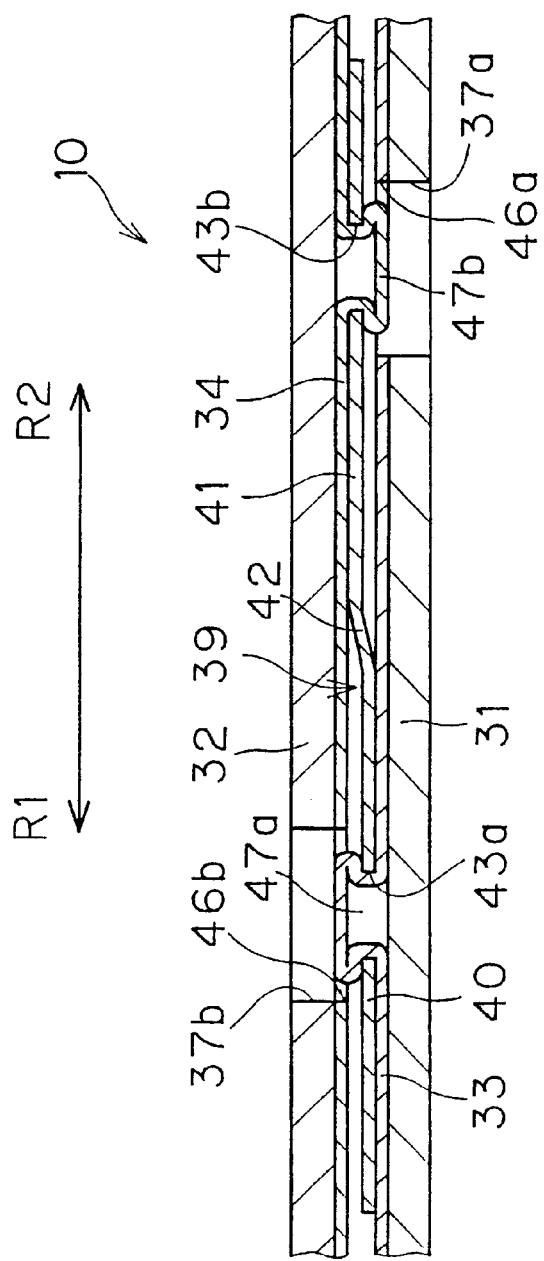
FIG. 4 is a fragmentary cross section taken along line IV—IV in FIG. 2.
Figure 5:
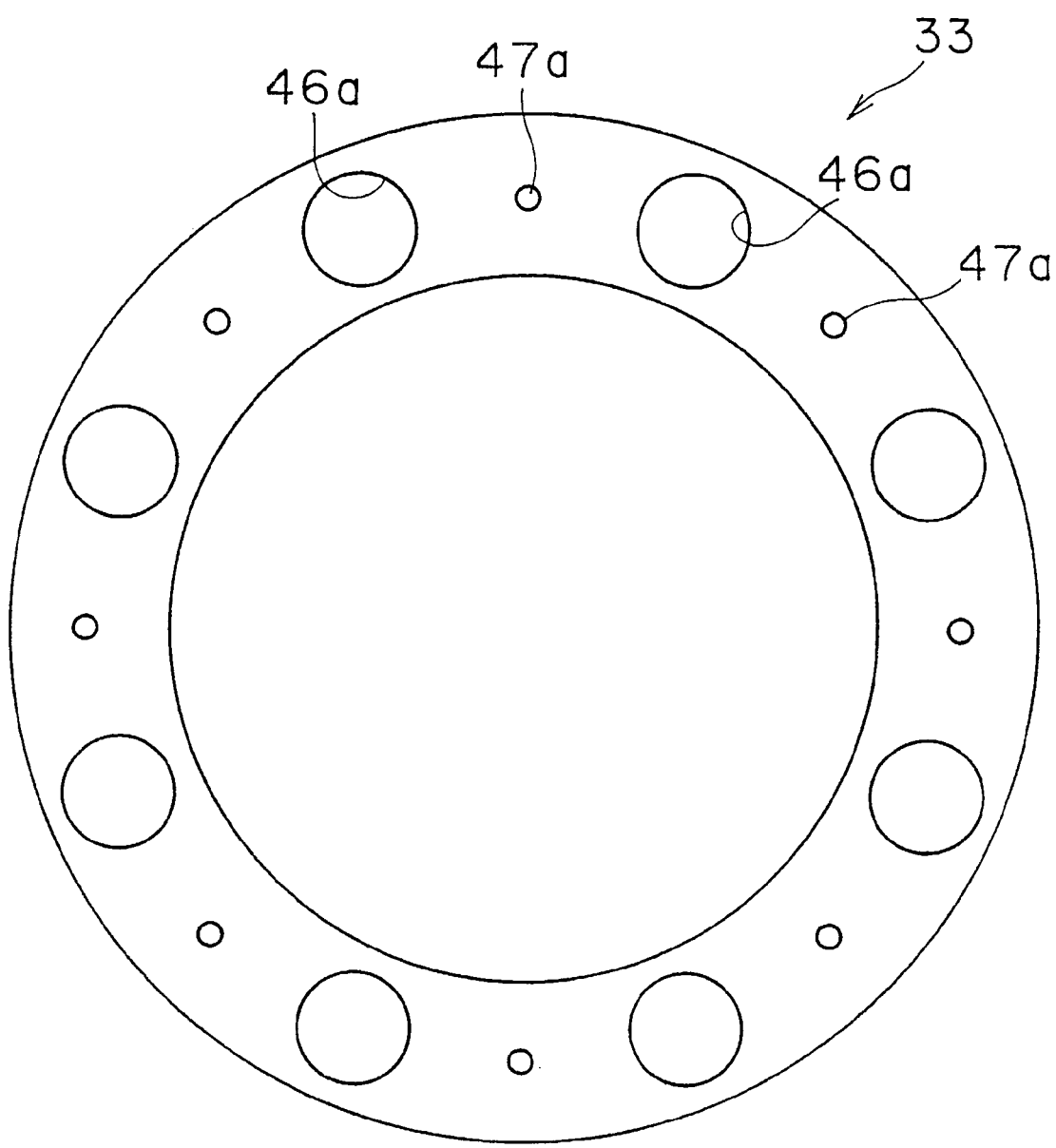
FIG. 5 is a plan view of a first core plate of the clutch disk assembly depicted in FIG. 1, shown removed from the clutch disk assembly.

The first core plate 33 is provided with engagement portions 47a located circumferentially between the third apertures 46a, as is shown in FIG. 5. Each engagement portion 47a has a projected form that extends axially outward from a main portion of the first core plate 33. The engagement portion 47a is hollow, and is made from a portion of the plate material which forms the remainder of the first core plate 33. The engagement portion 47a is fitted into the second aperture 43a in the first portion 40. In a final installed state, the engagement portion 47a has a collapsed and enlarged tip end, which is in contact with a periphery of the second aperture 43a and, more specifically, a surface of the first portion 40 adjacent to the second aperture 43a, facing the transmission (not shown). The head, i.e., collapsed portion of the engagement portion 47a has a radius which is larger than that of the second aperture 43a but is smaller than those of the third and first apertures 46b and 37b, as is shown in FIG. 4. Owing to the above structure, the first core plate 33 is fixed to the second portion 41.

The second friction member 32 is provided with the plurality of first apertures 37b which are circumferentially equally spaced from each other. Each of the first apertures 37b correspond to the second apertures 43a formed in the first portions of the cushioning portions 39, respectively. More specifically, the first apertures 37b are coaxial with the second apertures 43a, respectively. Each first aperture 37b has a larger diameter than the second aperture 43a. The first apertures 37b in the second friction member 32 are arranged circumferentially alternately with respect to the first apertures 37a in the first friction member 31. Thus, the first apertures 37a are circumferentially shifted or offset from the first apertures 37b.

The second friction member 32 is fixed to an annular second core plate 34. The second core plate 34 is made of, e.g., soft-iron and has an extremely small axial thickness. The second core plate 34 is provided at positions, which correspond to the first apertures 37b in the second friction member 31, respectively, with third apertures 46b. More specifically, the first apertures 37b and the third apertures 46b are coaxial with each other, respectively, and have the equal radii.

The second core plate 34 is provided with engagement portions 47b located circumferentially between the third apertures 46b. Each engagement portion 47b has an axially projected form. The engagement portion 47b is hollow, and is made of a plate integral with the second core plate 34. The engagement portion 47b is caulked in the second aperture 43b by collapsing the tip end. The head, i.e., collapsed portion of the engagement portion 47b has a radius which is larger than that of the second aperture 43b but is smaller than those of the third and first apertures 46a and 37a.

The heads of the engagement portions 47a of the first core plate 33 are located within the third apertures 46b in the second core plates 34, and are not fitted into the first apertures 37b in the second friction member 32, respectively. The engagement portions 47b of the second core plates 34 are disposed within the third apertures 46a in the first core plate 33, and are not fitted into the first apertures 37a in the first friction member 31, respectively. However, when the clutch disk 10 is pressed, and thereby the first and second friction members 31 and 32 approach each other, the head of each engagement portion 47a moves into the first aperture 37b, and the head of each engagement portion 47b moves into the first aperture 37a.

The structure of the clutch disk 10 will be described below in another way. A first friction portion formed of the first friction member 31 and the first core plate 33 and a second friction portion formed of the second friction member 32 and the second core plate 34 are fixed to the axially opposite sides of the cushioning plates 35, respectively. For this fixing, the engagement portions 47a formed at the first core plate 33 and the engagement portions 47b formed at the second core plate 34 are caulked to the cushioning portions 39.

The manner of fixing the clutch disk 10 will now be described below.

Figure 6:
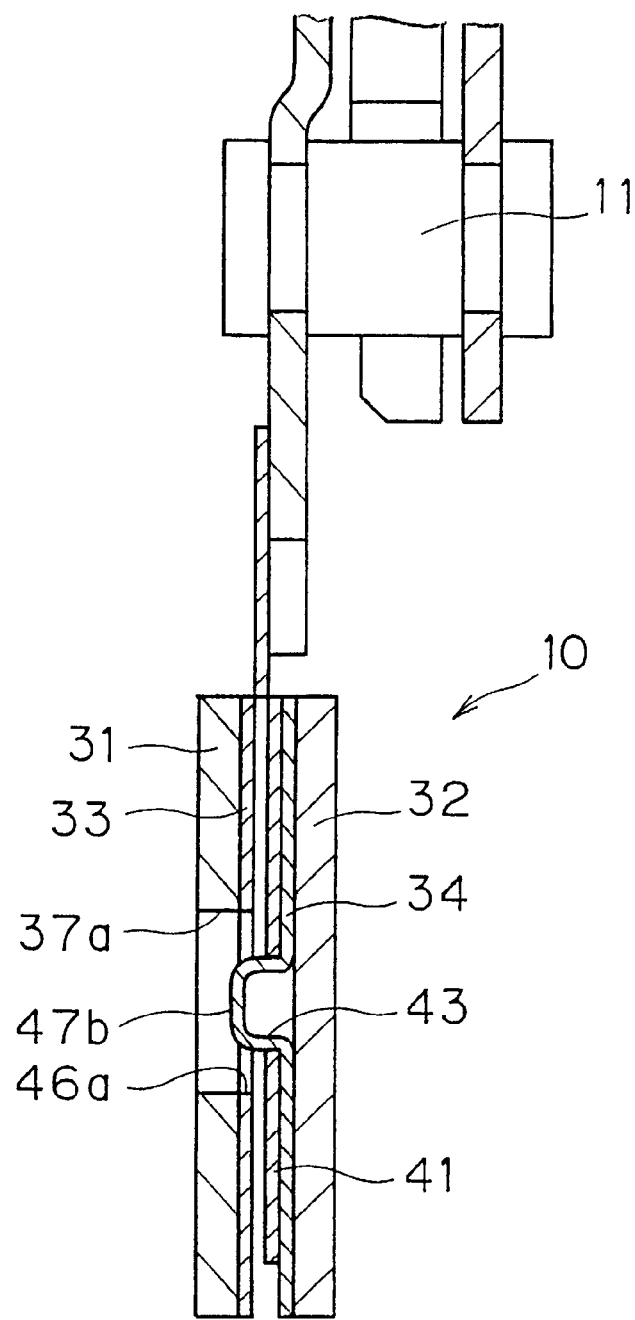
FIG. 6 is a fragmentary cross section similar to FIG. 3, showing the clutch disk assembly at one stage during an assembly process.

First, the plurality of cushioning plates 35 are fixed to the clutch plate 3 by the rivets 17. Then, the first and second friction members 31 and 32 are prepared for assembly. Before assembly, the first core plate 33 provided with the third apertures 46a and the engagement portions 47a is fixed to the first friction member 31, and the second core plate 34 provided with the engagement portions 47b and the third apertures 46b are fixed to the second friction member 32. The engagement portions 47a and 47b have cylindrical or columnar forms as shown in FIG. 6, and extend axially straight.

Then, the first friction member 31 is fixed to the plurality of cushioning portions 39. In this operation, the engagement portions 47a of the first core plate 33 are inserted into the second apertures 43a in the first portions 40 of the cushioning portions 39, respectively. After this, a caulking tool is inserted into the first apertures 37b in the second friction member 32 and the third apertures 46b in the second core plate 34, and thereby the engagement portions 47a of the first core plate 33 are deformed. Thereby, the first friction member 31 is fixed to the cushioning plates 35. Then, the second friction member 32 is fixed to the cushioning plates 35. For this, the engagement portions 47b of the second core plate 34 are inserted into the second apertures 43b in the second portions 41 of the cushioning portions 39 (FIG. 6). After this, the caulking tool is inserted into the first apertures 37a in the first friction member 31 and the third apertures 46a in the first core plate 34, and the engagement portions 47b of the second core plate 34 are deformed. Thereby, the second friction member 32 is fixed to the cushioning plates 35. In the above manner, fixing of the clutch disk 10 can be performed through simple steps of caulking the projected portions of the core plates.

The present invention has several advantages over prior art configurations where a rivet structure is used to fix friction disks to cushioning plates.

Since the engagement portions 47a and 47b are integral with the first and second core plates 33 and 34, respectively, independent parts such as rivets are not required. This facilitates easier management of the parts, and can reduce the number of assembly steps.

(2) Since the engagement portions 47a and 47b are made of from portions of thin backing plates of the friction members, they have smaller weights than rivets used in the prior art. Accordingly, the moments of inertia of the clutch disk 10 and the whole frictional coupling portion can be reduced.

(3) The heads (collapsed portions) of the engagement portions 47a and 47b are axially shorter than the heads of the rivets. Therefore, the effective service life or useful thickness of the first and second friction members 31 and 32 can be increased. Also, a sufficient cushioning effect is still ensured with the configuration of the present invention.

Since this embodiment is provided with the first and second core plates 33 and 34, the plates 33 and 34 may slightly increase the weight of a portion of the clutch disk 10. However, each of the first and second friction members 31 and 32 is provided with the plurality of first apertures 37a and 37b. The large diameter of the apertures 37a and 37b help to reduce the weight and therefore suppress increases in weight of the whole clutch disk 10.

If it is not required to increase the wearable thickness of the friction member, the thickness of the friction member can be reduced so that the weight and the moment of inertia can be reduced.

Figure 7:
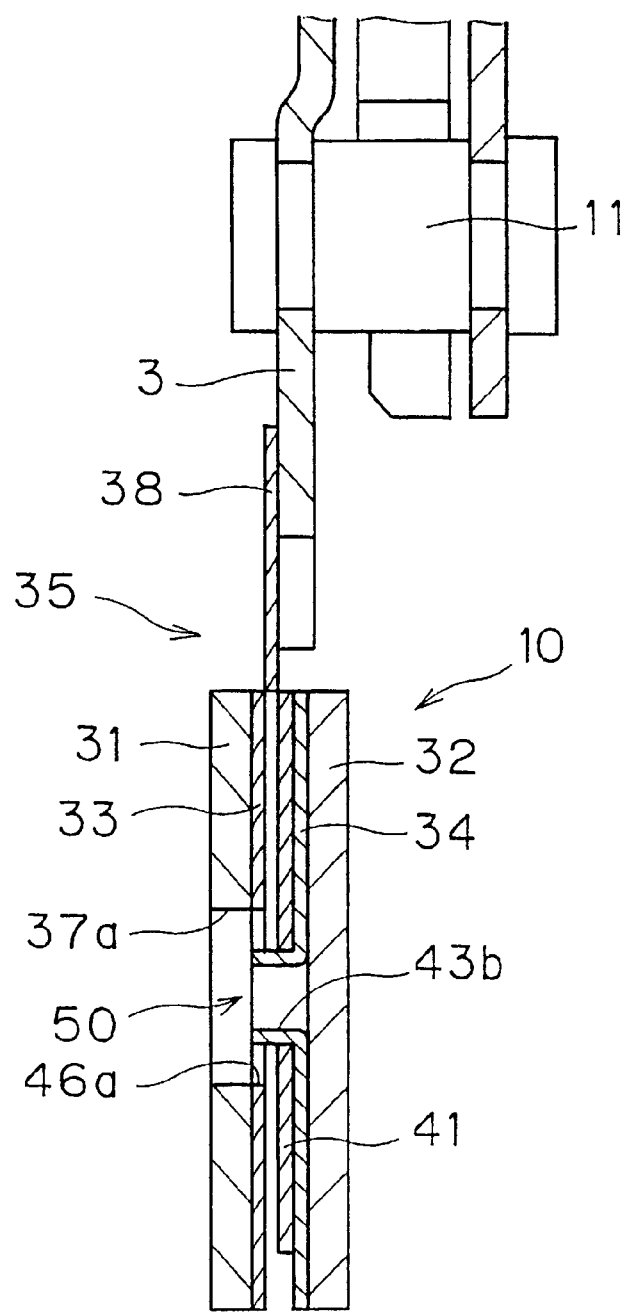
FIG. 7 is a fragmentary cross section similar to FIG. 3, a second embodiment of the present invention.
Figure 8:
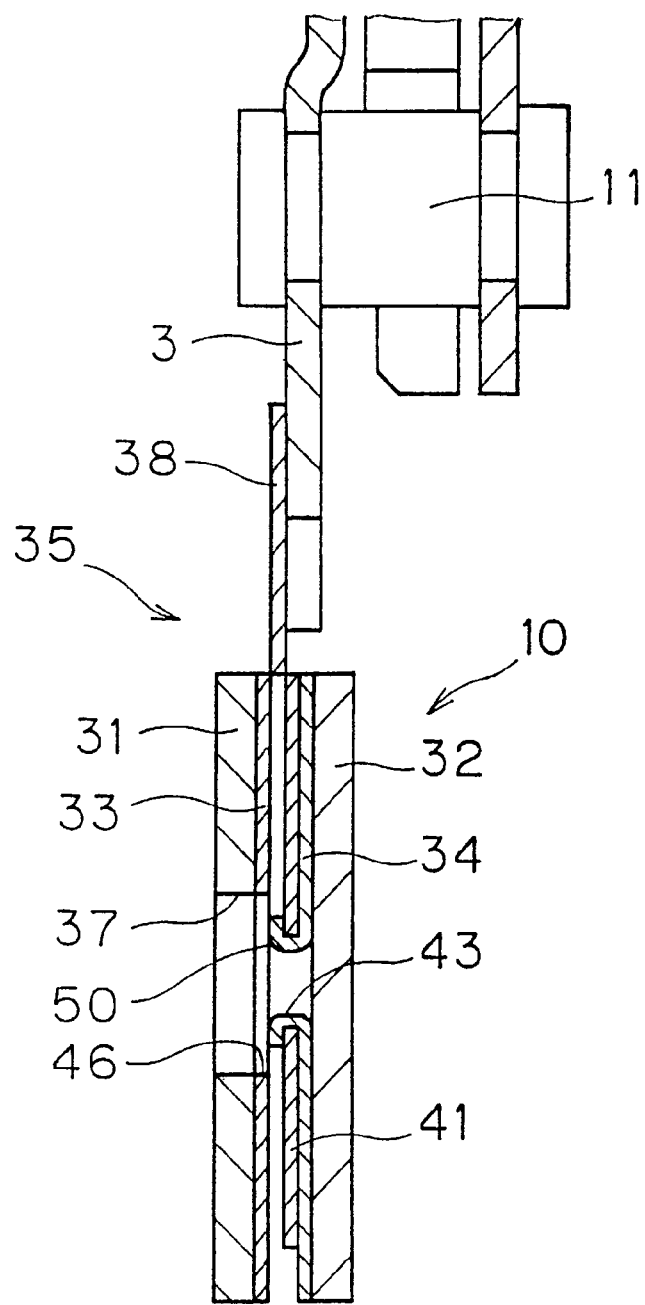
FIG. 8 is a fragmentary cross section similar to FIGS. 6, showing a third embodiment of the present invention.

In the embodiment described above, the engagement portions 47a and 47b have closed ends which, as shown in a pre-fixed state in FIG. 6, have a cup-like shape. However, engagement portions 50 may have an open end, i.e., an end having an aperture as shown in FIGS. 7 and 8. In the pre-fixed state shown in FIG. 7, the engagement portions 50 have an axial columnar or cylindrical shape. In a final assembling step, the engagement portions 50 are deformed, whereby the tip end of the engagement portion 50 is caulked and is pressed against the opposite surface of the cushioning portion, as shown in FIG. 8. In the structure of the second embodiment depicted in FIGS. 7 and 8, effects similar to those of the first embodiment can be achieved along with a further weight reduction.

In the clutch disk according to the invention, the core plate is fixed to each of the paired friction members, and the engagement portions of the core plates are engaged with the cushioning portions. Therefore, conventional rivets are not required, and the effective service thickness of the friction member can be sufficiently increased.

Figure 9:
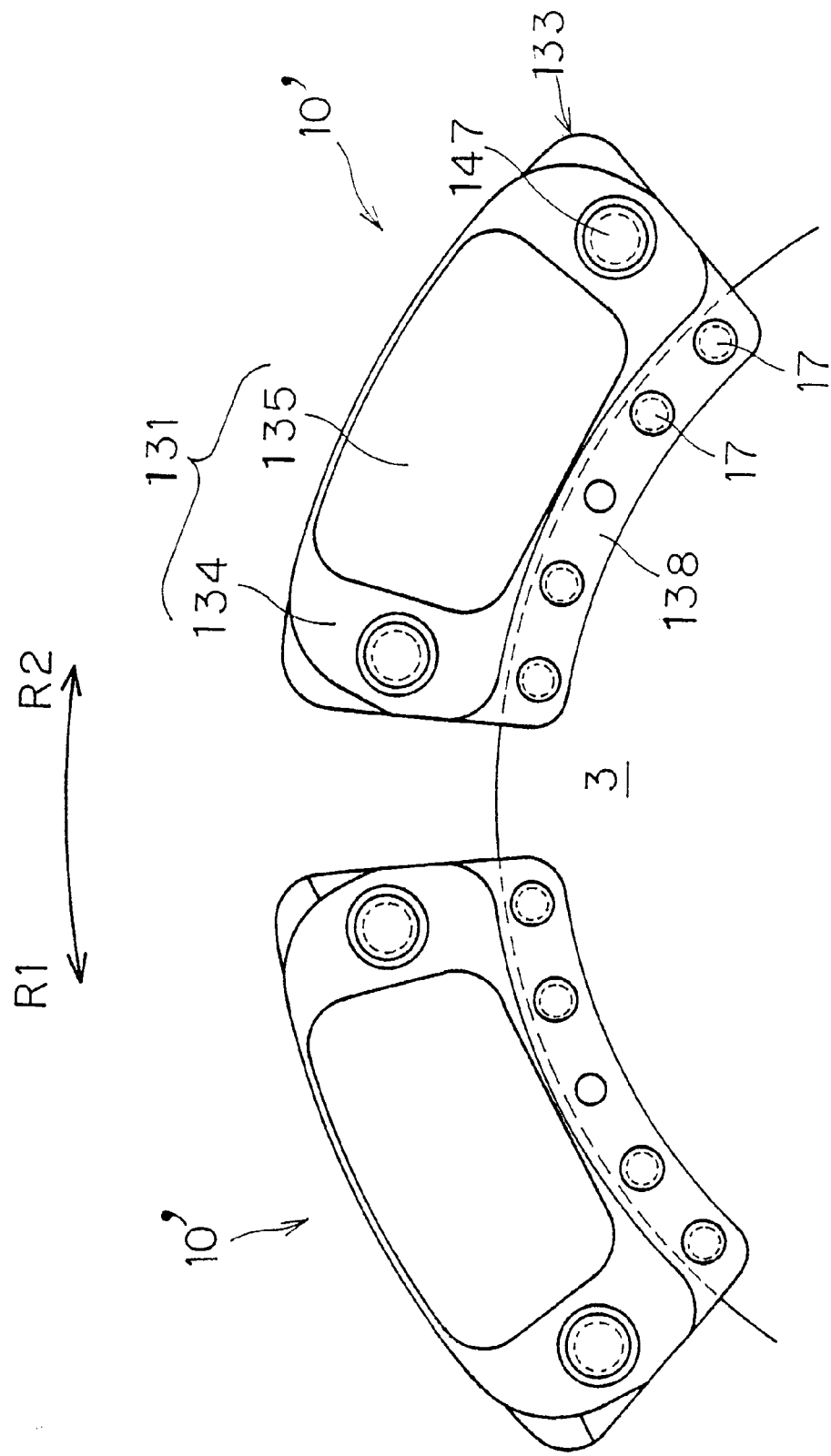
FIG. 9 is a fragmentary plan of a clutch disk of a fourth embodiment of the invention.
Figure 10:
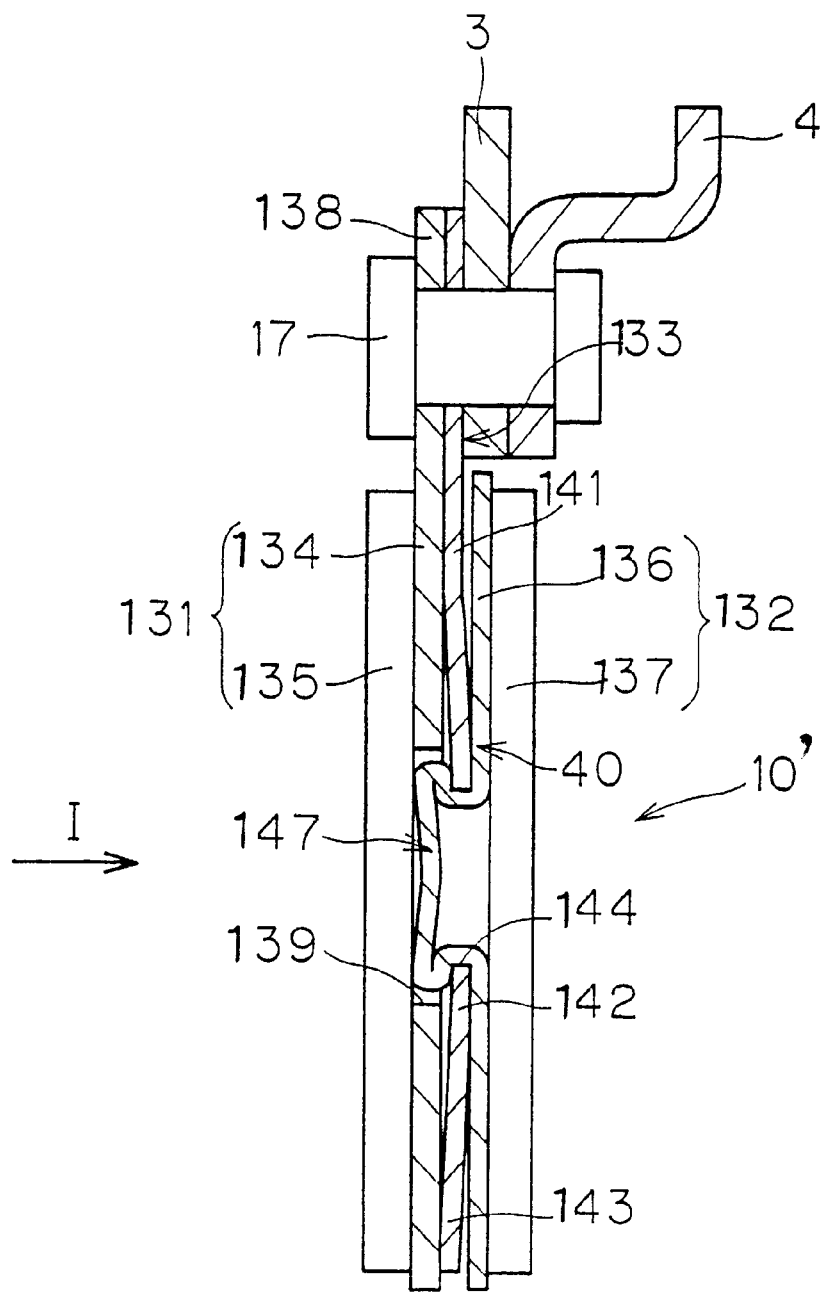
FIG. 10 is a fragmentary cross section of a portion of the clutch disk assembly depicted in FIG. 9.

A fourth embodiment of the present invention is depicted in FIGS. 9, 10, 11, 12, 13 and 14. In the fourth embodiment, a plurality of clutch pad assemblies 10? define an annular disk-like friction portion. The clutch pads 10? are disposed radially outside a clutch plate 3 and a retaining plate 4 of the clutch disk assembly, as shown in FIG. 9 and 10.

Each clutch pad assembly 10? is basically formed of a first friction portion 131, a second friction portion 132 and a cushioning plate 133.

Figure 11:
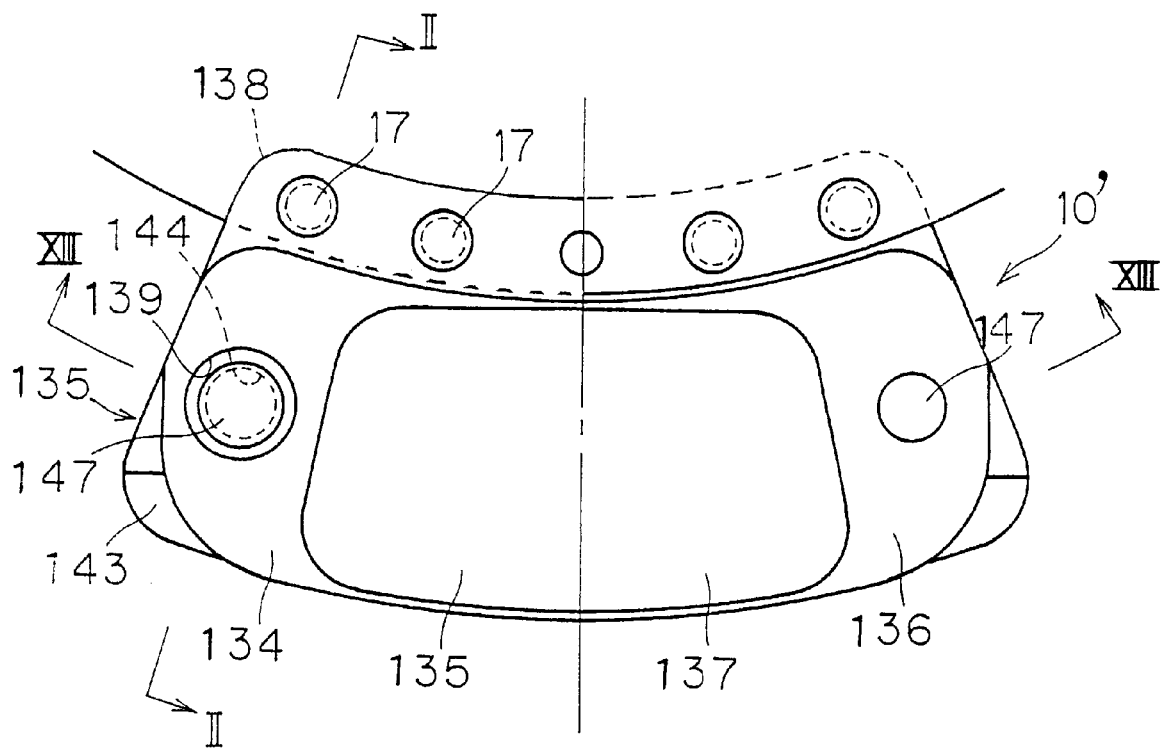
FIG. 11 is a fragmentary plan of a portion of the clutch disk assembly depicted in FIG. 9.
Figure 12:
FIG. 12 is a perspective view of a second core plate shown removed from the clutch disk assembly depicted in FIG. 9.
Figure 13:
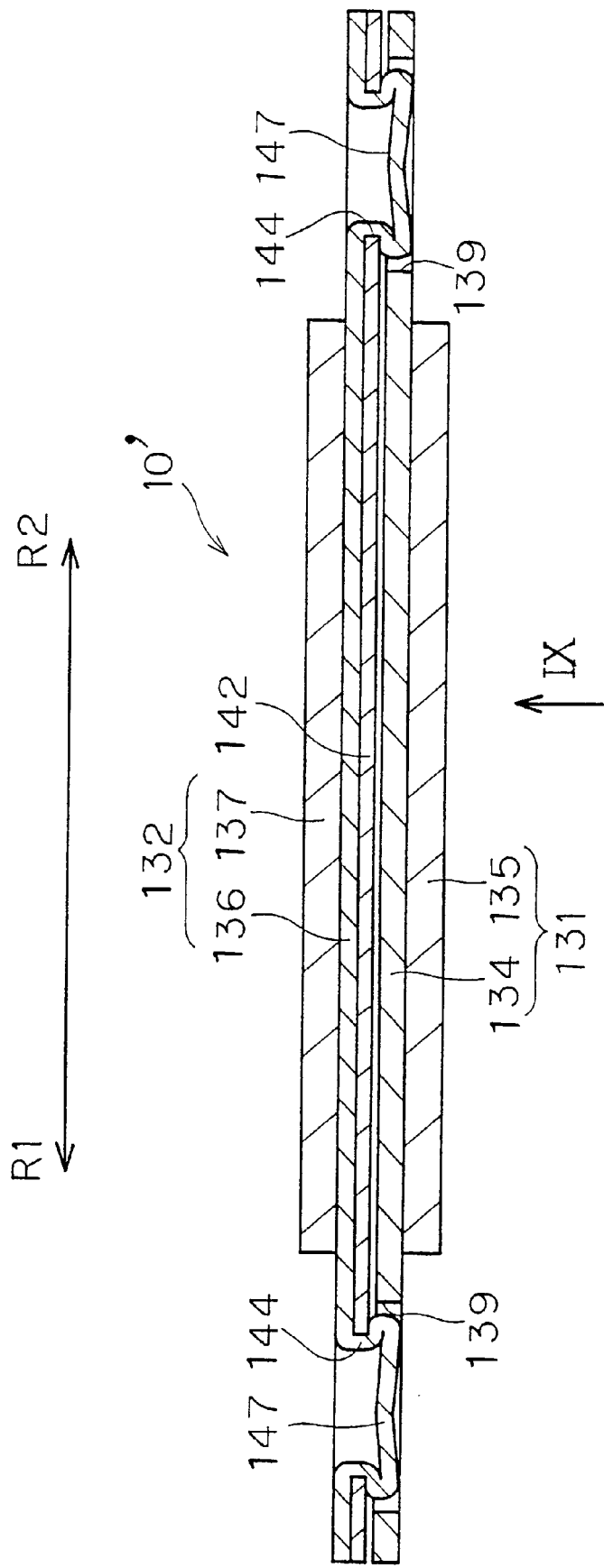
FIG. 13 is a cross section taken along line XIII—XIII in FIG. 11.

The first friction portion 131 is formed of a first friction member (metallic friction facing) and a first core plate 134 (backing plate). A first friction member 135 of the first friction portion is formed of a sintered body made of power of ceramics or graphite and powder of Cu—Sn alloy. The first friction member 135 has a generally rectangular plate-like shape having a circumferential length longer than a radial length. The first core plate 134 is a thin plate made of, e.g., iron. The first friction member 135 is fixed to the first core plate 134 by sintering. The first core plate 134 has circumferentially opposite ends which extends circumferentially beyond the circumferential ends of the first friction member 135. The first core plate 134 is provide at circumferentially opposite portions with second circular apertures 139, respectively. The first core plate 134 extends radially inward beyond a radially inner edge the first friction member 135, and has an inner peripheral portion which is fixed to the clutch plate 3 by a plurality of rivets 17, as is shown in FIGS. 9, 10 and 11.

The cushioning plate 133 is a thin plate member arranged on the side of the first core plate 134 near a transmission (right side in FIG. 3). The cushioning plate 133 has a sector form. The cushioning plate 133 is formed of a fixing portion 138 fixed to the clutch plate 3 by the rivets 17 and a cushioning portion 140 formed radially outside the fixing portion 138. The circumferential and radial lengths of the cushioning plate 140 are substantially equal to those of the first core plate 134. The cushioning portion 140 has a curved or stepped portion having a wavy section. More specifically, the cushioning portion 140 has a first portion 141, a second portion 142 and a third portion 143. The first portion 141 extends radially outward from the fixing portion 138 and defines a radially inner portion of the first portion 140. The second portion 142 extends radially outward from the first portion 141 and is deformed slightly such that it extends toward the transmission, as is depicted in FIG. 10. The third portion 143 extends radially outward from the second portion 142 and is curved back such that it extends toward the engine. The radially ends of the first and third portions 141 and 143 are in contact with the first core plate 134. The cushioning plate 133 is provided at circumferentially opposite end portions of the radially middle portion, i.e., the second portion 142, with first circular apertures 144 corresponding to the second apertures 139. Each first aperture 144 is smaller in diameter than a second aperture 139 formed in the first core plate 134, and is coaxial with a corresponding one of the second aperture 139.

The second friction portion 132 is formed of a second friction member 137 (metallic friction facing) and a second core plate 136 (back plate). The second friction member 137 is similar to the first friction member 135. The second core plate 136 is similar to the first core plate 134, but has a thickness smaller than that of the first core plate 134. Also, the second core plate 136 extends only slightly radially inward from a radially inner edge of the second friction member 137, and therefore is shorter in the radially inward direction than the first core plate 134. The second core plate 136 is axially opposed to the first core plate 134, and is in contact with the second portion 142 of the cushioning portion 140. Thereby, a desired space (cushion quantity) is kept axially between the first and second core plates 134 and 136 with the clutch disk assembly in a clutch disengagement condition (where no compressive forces are acting on the first and second friction members 135 and 137. The second core plate 136 is provided at its circumferentially opposite ends with engagement portions 147. The engagement portion 147 is formed correspondingly to the first and second apertures 144 and 139. Each engagement portion 147 is a projection which is projected from the main portion of the second core plate 136 toward the engine, and is formed, e.g., by drawing or deforming. Thus, the engagement portion 147 has a plate structure extending integrally from the main portion of the second core plate 136.

The engagement portion 147 is fitted into the first aperture 144 in the cushioning portion 140, and has a collapsed tip end, which is in intimate contact a side of the periphery of the first aperture 144 near the engine. Thereby, the second core plate 136 is firmly fixed to the cushioning plate 140. As a result, the second friction portion 132 is firmly coupled to the cushioning portion 140. The head of the engagement portion 147 is arranged within the second aperture 139 in the first core plate 134, and its axial movement is not restricted. The head of the engagement portion 147 is circular, and has a diameter larger than that of the second aperture 139 but smaller than that of the first aperture 144.

Figure 14:
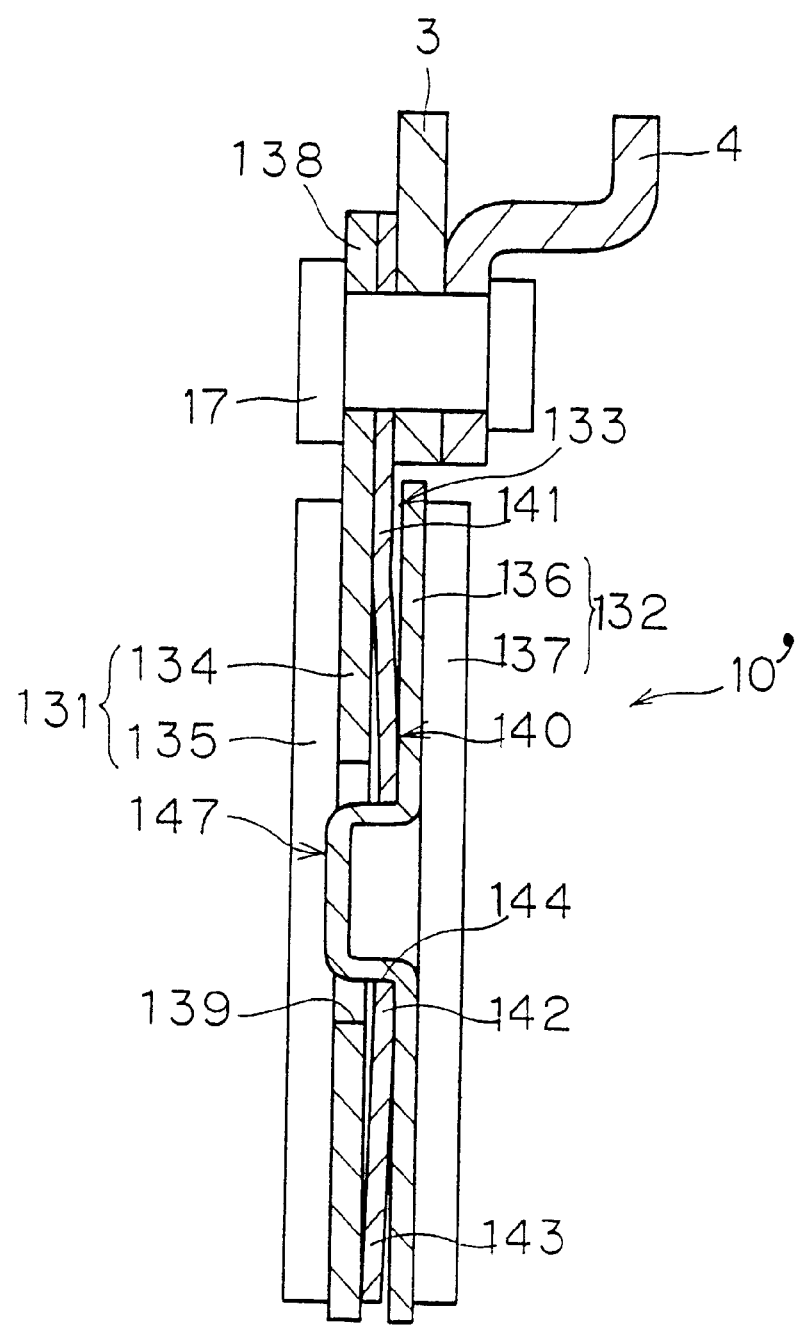
FIG. 14 is a fragmentary cross section similar to FIG. 10 showing the clutch disk assembly at one stage of an assembling process.
Figure 15:
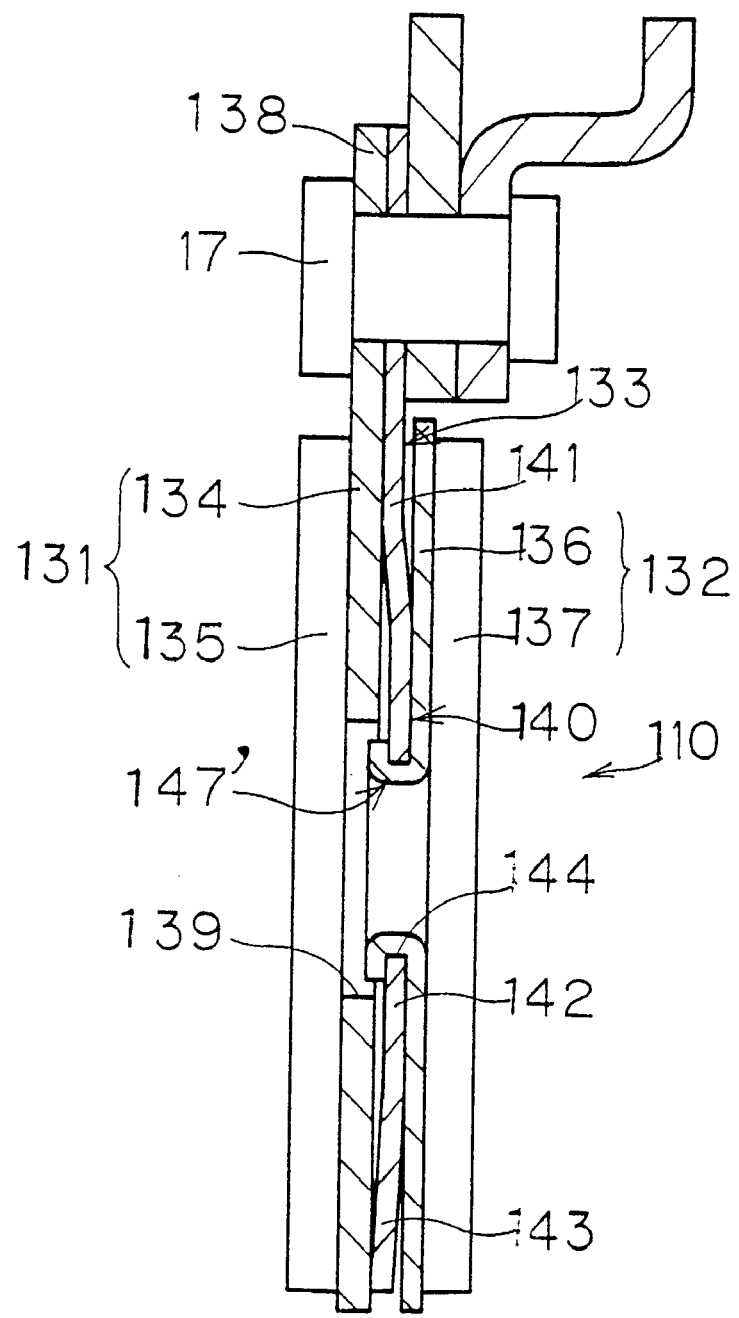
FIG. 15 is a fragmentary cross section similar to FIG. 10 showing a fifth embodiment of the present invention.

Referring to FIG. 14, a manner of attaching the clutch pad assemblies 10? is described below. First, the first friction portions 131 and the cushioning plates 133 are fixed to the clutch plate 3 by the rivets 17. Then, the second friction portions 132 are fixed to the right side of the cushioning plate 133 in FIG. 6. More specifically, each engagement portion 147 of the second core plate 136 is fitted into the first aperture 144 in the cushioning portion 140. The engagement portion 147 thus fitted has a cylindrical form extending straight in the axial direction (FIG. 14). Then, each of the engagement portions 147 are caulked, and the tip end portion is brought into intimate contact with the periphery of the first aperture 144 in the cushioning portion 140 and, more specifically, the side of the above periphery near the engine.

According to the foregoing steps, the first and second friction portions 131 and 132 are coupled to the cushioning plate 133 by deforming (caulking) the engagement portions 147 (projections) of the second core plate 36 so that the structure and manner for the coupling and fixing can be simple.

According to the above structure, the second friction portion 132 is axially movable with respect to the first friction portion 131 with the cushioning plate 133 therebetween. In other words, the first and second friction portions 131 and 132 move toward each other when the clutch is engaged, and the cushioning portion 140 of the cushioning plate 133 elastically deforms between the portions 31 and 32. Thereby, the cushioning effect can be achieved, and the characteristics during engagement of the clutch are improved.

Some of the advantages of the present invention over rivet fixed structures are listed below.

(1) Since the engagement portion 147 and the second core plate 136 are integral with each other, independent parts such as rivets are not required. This facilitates management of the parts, and can reduce the number of assembly steps.

(2) Since the engagement portion 147 is made of the plate, it has a smaller weight than the rivet. Accordingly, the moments of inertia of the clutch pad assembly 10? and whole frictional coupling portion can be reduced.

(3) The engagement portion 147 has the head at only one of its axial ends. Therefore, a projection or the like is not present on the second friction portion 137, and the second friction member 137 can have an increased effective service thickness. Alternatively, the thickness of the friction member 137 can be reduced, and therefore the weight and the moment of inertia can be reduced.

Although the engagement portion 147 in the fourth embodiment described above has a closed tip end, it may have an engagement portion 147? having an open tip end as shown a fifth embodiment depicted in FIG. 7.

Although the first core plate in the foregoing embodiment is independent from the clutch plate, the first core plate may be integral with the clutch plate. Although the cushioning plate has the stepped portion curved in the radial section, the stepped portion may be curved in the circumferential section.

There are many advantages of above embodiments with metallic friction facings.

For instance, the invention can achieve an outstanding effect in the clutch disk using the friction members, because the invention can overcome the problems of the conventional structure such as increase in moment of the inertia and difficult in ensuring an intended cushioning quantity. The metallic friction facing may be of any type provided that it contains metal.

According to the clutch disk of the invention, since the engagement portion engaged with the cushioning plate is formed as a part of the second core plate, the rivet in the prior art is not required. Therefore, disadvantages caused by the rivets in the prior art can be overcome.

What is claimed is:

1. A clutch disk for use in a clutch disk assembly for engagement and disengagement with a flywheel, said clutch disk comprising:

first and second friction members;

first and second core plates, said first core plate being fixed to said first annular friction member and said second core plate being fixed to said second annular friction member;

a cushioning plate having first and second cushioning portions disposed between said first and second annular friction members, said first and second cushioning portions being axially offset with respect to one another and with respect to the clutch disk assembly;

wherein at least one of said first and second core plates is formed unitarily with at least one engagement portion which engages one of said first and second cushioning portions, and at least one of said first and second cushioning portions is provided with an aperture, and said engagement portion is a projection which extends through said aperture and said engagement portion is caulked into engagement about said aperture.

2. The clutch disk according to claim 1, wherein said projection and said at least one of said first and second core plates is formed integrally from a plate material, said projection being formed by deformation of said plate material.

3. The clutch disk according to claim 1, wherein said first and second friction members are each formed with an annular shape.

4. The clutch disk according to claim 1, wherein said first and second friction members comprise a plurality of friction pads circumferentially spaced apart from one another to define the clutch disk.

5. A clutch disk for use in a clutch disk assembly for engagement and disengagement with a flywheel, said clutch disk comprising:

an annular first friction member provided with a plurality of first apertures, said first apertures being circumferentially spaced apart from one another;

an annular second friction member axially spaced from said first friction member, said second friction member being provided with a plurality of second apertures that are circumferentially spaced apart from one another, said second apertures being circumferentially offset from said first apertures;

a first core plate fixed to said first friction member, said first core plate being formed with an aperture that is axially aligned with said first aperture in said first friction member, said first core plate further formed with at least one projection that extends in an axial direction away from said first friction member;

a second core plate fixed to said second friction member, said second core plate being formed with an aperture that is axially aligned with said second aperture in said second friction member, said second core plate further formed with at least one projection that extends in an axial direction away from said second friction member;

a plurality of cushioning plates, each cushioning plate having first and second cushioning portions which extend between said first and second core plates and which are axially offset from one another, said first cushioning portions being in contact with said first core plate and said second cushioning portions being in contact with said second core plate, said first cushioning portions each being provided with second apertures that are axially aligned with said second apertures in said second friction member, and said second cushioning portion being provided with first apertures that are axially aligned with said first apertures in said first friction member;

wherein, projections formed on said first core plate extends through said second aperture in said first cushioning portion, and said projection formed on said second core plate extends through said first aperture formed in said first cushioning portion.

6. The clutch disk according to claim 5, wherein said projections are caulked in said first and second apertures, respectively.

7. A clutch disk for use in a clutch disk assembly for engagement and disengagement with a flywheel, said clutch disk comprising:

a first friction portion having a first core plate and a first friction member fixed to said first core plate;

a second friction portion having a second core plate and a second friction member fixed to said second core plate, said second core plate being axially spaced from said first core plate; and a cushioning plate having a cushioning portion disposed between said first and second core plates, and arranged for rotation together with said first core plate, said second core plate being formed integrally with an engagement portion that is engaged with said cushioning portion;

wherein a first aperture is formed in said cushioning portion, and said engagement portion is a projection that extends through said first aperture and is caulked in place in said first aperture.

8. The clutch disk according to claim 7, wherein said projection extends integrally from said second core plate, and has a deformed tip end proximate a side of said cushioning portion adjacent to said first friction member.

9. The clutch disk according to claim 7, wherein said first core plate is provided with a second aperture receiving said projection.

10. The clutch disk according to claim 7, wherein said second core plate has circumferentially opposite ends which extend circumferentially beyond corresponding opposite ends of said second friction member, and said second core plate is provided at each of said circumferentially opposite ends with said projection, and said cushioning portion is provided at corresponding circumferentially opposite ends with said first apertures.

* * * * *